UNITED STATES PATENT OFFICE.

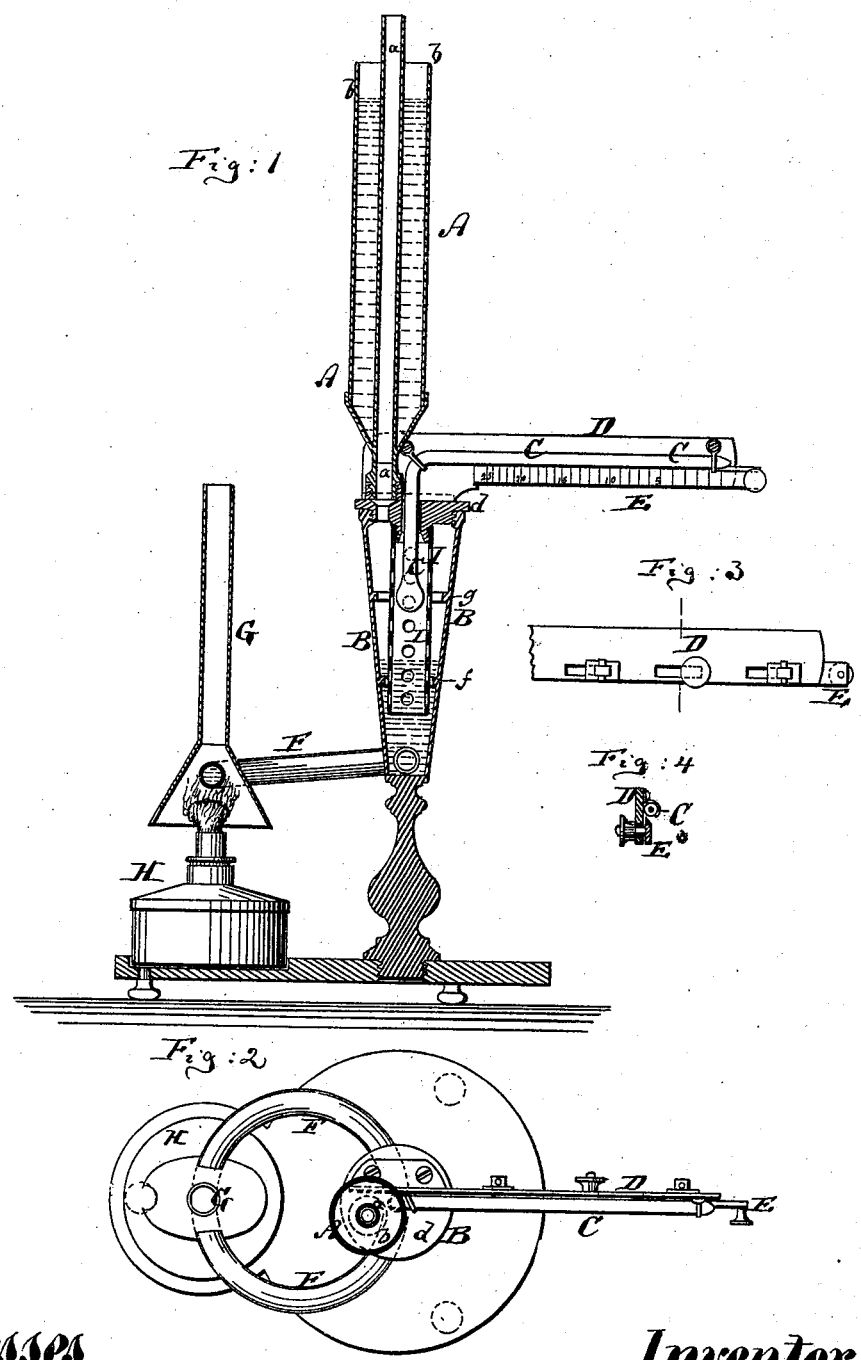

PIERRE M. E. MALLIGAND, OF PARIS, FRANCE.

IMPROVEMENT IN EBULLIOSCOPES.

Specification forming part of Letters Patent No. 173,128, dated February 8, 1876; application filed July 6, 1875.

*To all whom it may concern:*

Be it known that I, PIERRE MARIE EDOURD MALLIGAND, of Paris, France, have invented Improvements in Instruments known as Ebullioscopes, used for ascertaining the proportion of alcohol; and I do hereby declare that the following is a full, clear, and exact description of the same.

This invention relates to improvement in instruments known as ebullioscopes, used for ascertaining the proportion of alcohol present in liquids.

It is well known that, although the boiling-point of pure water is almost invariable under a constant barometric pressure, the boiling-point of water holding matters of organic or mineral origin in solution is liable to considerable variation, rising more or less, according to the proportion of such matters held in solution therein—a result which may be easily verified by means of a mercurial thermometer. It was, however, found by the Abbé Brossard-Vidal that alcohol holding certain matters in solution, such as sugar, resins, citric and tartaric acids, gives a different result, the presence of these matters in moderate quantities not affecting the boiling-point of the alcohol in which they are dissolved. This fact led to the method of estimating the proportion of alcohol present in wines and other alcoholic liquors by comparison of their boiling-points with the boiling-points of different mixtures of alcohol and water in known proportions. The instrument employed by the Abbé Brossard-Vidal for this purpose was of simple construction, and consisted of a small boiler contained within a perforated metal casing and heated by a spirit-lamp, said boiler being fitted with a removable cover, provided with two openings, through one of which was passed the stem of a thermometer bent at a right angle, the other being left unclosed during the boiling of the liquid to be tested. On this cover was fixed a horizontal bar, to which the thermometer was attached, and which also carried a small graduated scale for indicating the percentage of alcohol, this latter scale being adjustable to compensate for the differences of barometric pressure. This bent mercurial thermometer, having its bulb constantly immersed in the liquid to be tested, marked 100° centigrade (212° Fahrenheit) at the end of the stem, and 86° (187° Fahrenheit) at about four-fifths of an inch from the bend. The graduation of this instrument, known as the "ebullioscope," was effected by employing mixtures of water and alcohol, which were first tested by means of the areometer, and whose alcoholic strength was then precisely noted by means of the thermometer immersed in this same mixture when boiling.

The present invention relates to improvements in the instrument of which the foregoing is a brief outline.

In the accompanying drawing, Figure 1 is a vertical central section of my improved ebullioscope. Fig. 2 is a top view of the same; Fig. 3, a detail back view of the bar which supports the thermometer and the sliding scale. Fig. 4 is a vertical cross-section thereof.

Similar letters of reference indicate corresponding parts in all the figures.

These improvements consist, first, in the application of a condenser or cooler, A, to condense the vapors of the liquid undergoing the test and return the condensed liquid to the boiler B, and so maintain the composition of the said liquid constant during the whole time occupied in testing it, which may be five minutes or more, thus enabling the alcoholic strength of the boiling liquid to be determined with perfect certainty. Among the various arrangements which might be devised for attaining the desired result it is preferred to use for such condenser two straight tubes, $a$ and $b$, of glass or metal placed concentrically, the one $a$ within the other $b$ and screwed or otherwise fastened into the unclosed opening of the cover $d$ of the boiler, or otherwise attached to the boiler. At the bottom of the cooler may be fitted an exhaust-cock. The thermometer C of the instrument marks 100° centigrade (212° Fahrenheit) or 86° (187° Fahrenheit) toward the extremity of its stem, and 86° (187° Fahrenheit) or 76° (169° Fahrenheit) at about four-fifths of an inch from the bend of the stem, according as the thermometer is made to indicate the whole of the alcoholometric scale from 0° to 100°, (32° to 212° Fahrenheit,) or a part only from 0° to 25° (32° to 77° Fahrenheit); but the alcoholometric degrees may be further subdivided into as many parts as may be necessary. The thermometers may, moreover, be provided with small reservoirs or chambers to contain a certain number of degrees, according to the requirements of the graduation.

Another important feature of my invention consists in causing a circulation in the ebullioscope of the liquid by heating it in detail instead of applying heat directly to the whole bulk of the liquid. The boiler B, used for this purpose, consists of a vertical cylinder or a tube of slightly-conical form, open at its upper part only, on which is screwed the cover d, through which passes the bend of the thermometer C to dip into the boiler as well as the condenser-tube a, in which the alcoholic vapors become condensed. On this cover is fixed the horizontal bar D, to which the thermometer C is attached, as also a movable scale, E, graduated to indicate alcoholic degrees. The boiler, whose bottom may be either flat or concave, has connected to its lower part an annular tube, F, one end of which is at a lower level than the other, so as to form a portion of a spiral. At a point diametrically opposite the boiler this tube traverses a vertical chimney, G, of a width calculated to calibrate the heating-surface by that portion of the tube which is contained in said chimney. Below the chimney is placed a lamp, H, as shown.

The apparatus being arranged as described, it will be readily understood that, on the temperature of the small quantity of the liquid contained in that portion of the tube F exposed to the flame being raised, a circulating movement will ensue, which is soon imparted to the entire bulk of liquid, whose boiling-point thus becomes so constant that it may be maintained for about ten minutes. A small fixed or movable deflector, I, or perforated tube, is also provided, and suspended from the cover d into the boiler, its upper end admitting the bulb of the thermometer. This deflector serves, when plunged into the boiling liquid, to prevent the tumefaction of the alcoholic liquid during ebullition, which it regulates constantly, and to direct continually the hottest liquid to the center of the boiler—that is to say, toward the thermometer-bulb—while allowing the bubbles of steam to ascend at the same time that the slightly-cooler liquid passes down near the sides of the boiler, and, on reaching the bottom, reascends, and continues then to circulate throughout the whole time of boiling.

With the new form of boiler described, in which, instead of directly heating the bulk of liquid, a circulation of the liquid is produced in a tube exteriorly of the boiler, it is not indispensably necessary to use the deflector I above referred to; but it is necessary with the old mode of heating.

The instrument is supported on a leg sufficiently weighted to steady the same.

The instrument may be used for determining the boiling-points of liquids generally, either alcoholic or not, and whether simple or compound, the thermometer being immersed in the liquid contained in the boiler, or merely in the steam of said liquids.

In using the apparatus pure water is placed in the boiler until it reaches the lower ring f, or mark, in the boiler. The water is then boiled, the boiling-point being noted by bringing the zero of the movable scale E opposite the degree indicated by the mercurial column. The water is then replaced by the liquid to be tested, care having been taken to rinse out the boiler with some of the same, so that no water is allowed to remain. The boiler is then filled up to the upper ring g, or mark, in the boiler, and cold water supplied to the condenser-vessel b, attached at the top of the instrument. The lamp is then lighted, and as soon as the mercurial column becomes stationary in the stem, then, by means of the mercury above the scale E, the degree of the boiling is at once indicated.

The circulation of the liquid may be effected by other means than those herein described.

My improvements are applicable not only to ebullioscopes, but also to instruments intended to ascertain the boiling-point of any liquid.

I claim as my invention—

1. The combination of the boiler B with the open-ended condenser A, to prevent escape of a liquid in an ebullioscope, substantially as specified.

2. The combination of the boiler B of an ebullioscope with the circulating-tube F, and with the heater H, substantially as specified.

3. The combination of the boiler B with the thermometer C and sliding scale E, all arranged to constitute an ebullioscope, substantially as specified.

4. The reflector I, combined with the thermometer C and with the boiler B of an ebullioscope, substantially as specified.

PIERRE MARIE EDOUARD MALLIGAND.

Witnesses:
ROBT. M. HOOPER,
CHARLES DESNOS.